(12) United States Patent
Han

(10) Patent No.: US 9,176,914 B2
(45) Date of Patent: Nov. 3, 2015

(54) METHOD FOR CONFIGURATING CANOPEN NETWORK, METHOD FOR OPERATING SLAVE DEVICE OF CANOPEN NETWORK AND SYSTEM FOR CONTROLLING PLC DEVICE USING CANOPEN NETWORK

(71) Applicant: LSIS CO., LTD., Anyang-si, Gyeonggi-do (KR)

(72) Inventor: Seung Shin Han, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 293 days.

(21) Appl. No.: 13/859,513

(22) Filed: Apr. 9, 2013

(65) Prior Publication Data

US 2013/0332636 A1  Dec. 12, 2013

(30) Foreign Application Priority Data

Jun. 12, 2012  (KR) .......................... 10-2012-0062536

(51) Int. Cl.
| | | |
|---|---|---|
| *G06F 3/00* | (2006.01) | |
| *G06F 13/00* | (2006.01) | |
| *G06F 13/40* | (2006.01) | |
| *H04L 12/403* | (2006.01) | |

(52) U.S. Cl.
CPC .......... *G06F 13/4068* (2013.01); *H04L 12/403* (2013.01)

(58) Field of Classification Search
CPC ................ H04L 12/403; H04L 2012/40215; H04L 61/2038; H04L 29/12254; G06F 12/0661
USPC ................................................ 710/4, 9, 110
See application file for complete search history.

(56) References Cited

U.S. PATENT DOCUMENTS

| | | | |
|---|---|---|---|
| 6,581,117 B1 | 6/2003 | Klein et al. | |
| 6,779,046 B1* | 8/2004 | Osuga | ............................. 710/14 |
| 2006/0265489 A1* | 11/2006 | Moore | .......................... 709/223 |
| 2006/0282549 A1* | 12/2006 | Vinnemann | ...................... 710/3 |

(Continued)

FOREIGN PATENT DOCUMENTS

| | | |
|---|---|---|
| EP | 2393247 | 12/2011 |
| KR | 10-2012-0003695 | 1/2012 |
| WO | 2011120999 | 10/2011 |

OTHER PUBLICATIONS

Cena, et al., "A Protocol for Automatic Node Discovery in CANopen Networks", IEEE Transactions on Industrial Electronics, vol. 50, No. 3, Jun. 2003, 12 pages (Relevant pp. 1-3).

(Continued)

*Primary Examiner* — Faisal M Zaman
(74) *Attorney, Agent, or Firm* — Lee, Hong, Degerman, Kang & Waimey

(57) ABSTRACT

Disclosed are a method of configurating a CANopen network, a method of operating a slave device of the CANopen network, and a system for controlling a PC device using the CANopen network. The method of operating the slave device connected to the CANopen network includes creating a process data object for transmission, designating identifier information for the process data object, and transmitting the created process data object to a device corresponding to the designated identifier information. The identifier information includes a communication object identifier allowing another slave device or a master device connected to the CANopen network to receive the process data object.

15 Claims, 13 Drawing Sheets

(56) References Cited

U.S. PATENT DOCUMENTS

| | | | |
|---|---|---|---|
| 2008/0089361 A1* | 4/2008 | Metcalf et al. | 370/474 |
| 2008/0276107 A1* | 11/2008 | Bogavac | 713/323 |
| 2009/0157929 A1* | 6/2009 | Pigott et al. | 710/110 |
| 2009/0185215 A1* | 7/2009 | Kreppold et al. | 358/1.15 |
| 2009/0287318 A1* | 11/2009 | Reidt | 700/3 |
| 2010/0088442 A1* | 4/2010 | Kuschke | 710/110 |
| 2010/0306431 A1* | 12/2010 | Adkins et al. | 710/110 |
| 2011/0072176 A1* | 3/2011 | Hsu et al. | 710/110 |
| 2011/0125945 A1* | 5/2011 | Link et al. | 710/110 |
| 2011/0157389 A1* | 6/2011 | McClellan | 348/222.1 |
| 2012/0083902 A1* | 4/2012 | Daum et al. | 700/3 |
| 2013/0073761 A1* | 3/2013 | Nierop et al. | 710/110 |
| 2013/0080585 A1* | 3/2013 | Schaffner et al. | 709/217 |
| 2013/0311691 A1* | 11/2013 | Barrenscheen et al. | 710/110 |
| 2014/0121785 A1* | 5/2014 | Ismail et al. | 700/3 |
| 2015/0048797 A1* | 2/2015 | Song | 320/134 |

OTHER PUBLICATIONS

European Patent Office Application Serial No. 13165277.8, Search Report dated Aug. 6, 2013, 6 pages.

Korean Intellectual Property Office Application Serial No. 10-2012-0062536, Office Action dated Jul. 27, 2015, 6 pages.

* cited by examiner

Prior Art
FIG.3

| CAN-ID | |
|---|---|
| | (Node-ID) |
| | Function code |

Prior Art
FIG. 4

| COB | Function code | CAN-ID range |
|---|---|---|
| transmit PDO (TPDO) 1 | $0011_b$ | $385(181_h) - 511(1FF_h)$ |
| receive PDO 1 | $0100_b$ | $513(201_h) - 639(27F_h)$ |
| transmit PDO (TPDO) 2 | $0101_b$ | $641(281_h) - 767(2FF_h)$ |
| receive PDO 2 | $0110_b$ | $769(301_h) - 895(37F_h)$ |
| transmit PDO (TPDO) 3 | $0111_b$ | $897(381_h) - 1023(3FF_h)$ |
| receive PDO 3 | $1000_b$ | $1025(401_h) - 1151(47F_h)$ |
| transmit PDO (TPDO) 4 | $1001_b$ | $1153(481_h) - 1279(4FF_h)$ |
| receive PDO 4 | $1010_b$ | $1281(501_h) - 1407(57F_h)$ |

Prior Art
FIG.5

| index | 1800h to 19FFh |
|---|---|
| name | transmit PDO communication parameter |

| sub-index | 01h |
|---|---|
| feature | COB-ID of transmit PDO |

Prior Art
FIG.6

| index | $1600_h$ to $17FF_h$ |
|---|---|
| name | receive PDO communication parameter |

| sub-index | $01_h$ |
|---|---|
| feature | COB-ID of receive PDO |

Prior Art
FIG.7

| index | COB-ID of transmit PDO |
|---|---|
| $1400_h$ | CAN-ID: $200_h$ + Node-ID |
| $1401_h$ | CAN-ID: $300_h$ + Node-ID |
| $1402_h$ | CAN-ID: $400_h$ + Node-ID |
| $1403_h$ | CAN-ID: $500_h$ + Node-ID |
| $1404_h$ to $15FF_h$ | CAN-ID: profile or Spec. of manufacturer |

| index | COB-ID of receive PDO |
|---|---|
| $1800_h$ | CAN-ID: $180_h$ + Node-ID |
| $1801_h$ | CAN-ID: $280_h$ + Node-ID |
| $1802_h$ | CAN-ID: $380_h$ + Node-ID |
| $1803_h$ | CAN-ID: $480_h$ + Node-ID |
| $1804_h$ to $19FF_h$ | CAN-ID: profile or Spec. of manufacturer |

METHOD FOR CONFIGURATING CANOPEN NETWORK, METHOD FOR OPERATING SLAVE DEVICE OF CANOPEN NETWORK AND SYSTEM FOR CONTROLLING PLC DEVICE USING CANOPEN NETWORK

CROSS REFERENCE TO RELATED APPLICATION

Pursuant to 35 U.S.C. §119(a) this application claims the benefit of earlier filing date and right of priority to Korean Patent Application No. 10-2012-0062536, filed on Jun. 12, 2012, the contents of which are incorporated by reference herein in its entirety.

BACKGROUND

The embodiment relates to a method of configurating a CANopen network, a slave device, and a system for controlling a PLC. In more particular, the embodiment relates to a method of configurating a CANopen network capable of reducing a network load and a transmission delay time, a slave device using the same, and a system for controlling a PLC device.

A control area network (CAN) bus is a two-wire serial communication bus which is an industry standard extensively used for vehicle and industrial control applications, as well as medical equipment, aerial electronic engineering, office automation facilities, consumer products, many other products, and applications. A CAN controller is an independent device configured to interface with a micro-controller. The CAN controller is currently usable in the form of a circuit integrated in a micro-control chip or a module inserted into the micro-controller chip. Since 1986, CAN users (software programmers) have developed a plurality of high-level CAN application layers (CAL) to expand the functions of the CAN while supporting the specification of the CAN with the use of a CAN physical layer and a CAN frame format. A CANopen is one of the CALs, and has been used for network management and monitoring of programmable logic controller (PLC) equipment in various industrial fields while serving as a protocol to support a CAN network.

FIG. 1 shows a CANopen network using a typical CANopen protocol. The CANopen network includes slave devices 11 and 12, and a master device 10 to manage the slave devices 11 and 12.

FIG. 2 is a view to explain the communication procedure between the master device 10 and the first slave device 11, and between the master device 10 and the second slave device 12. FIGS. 3 to 7 are views to explain data transceived in the CANopen network.

As shown in FIG. 2, the master device 10 may be allocated with transmit PDO ports and receive PDO ports to transceive process data objects (POD) based on a CANopen protocol with each slave device. In addition, each of the first slave device 11 and the second slave device 12 may be allocated with transmit PDO ports and receive PDO ports to transceive PDOs with the master device 10.

As shown in FIG. 2, each of the first and second slave devices 11 and 12 receives a PDO from the master device 10 through the receive PDO port thereof, and transmits a PDO to the master device 10 through the transmit PDO port thereof. In this case, each port may be identified through a CANopen object (COB) ID.

Figure 3:
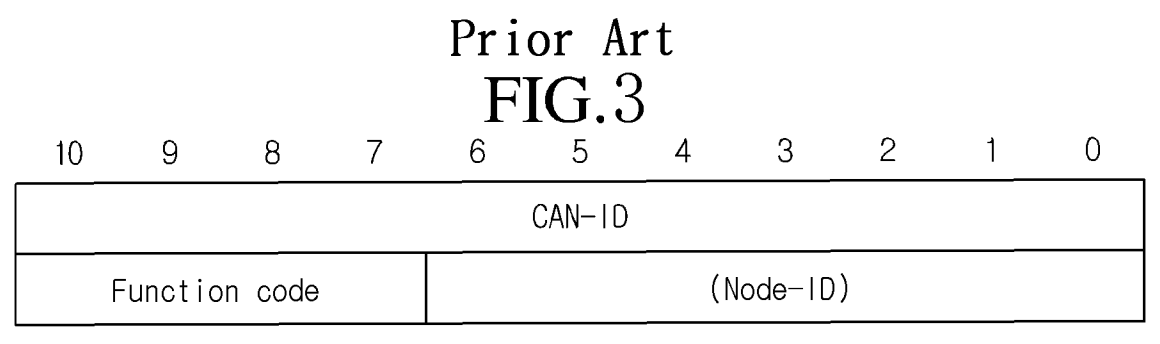

FIG. 3 shows a CAN ID serving as a data identifier transceived over a CAN network. The CAN ID contains a 4-bit function code and a 7-bit node ID, and is transceived together with a PDO. The function code may be designated according to data services, and the node ID refers to a number to identify a slave device to which data are transmitted.

FIG. 4 is a view showing the case that the CAN ID is used to identify the PDO. The PDO may be divided into a transmit PDO and a receive PDO. The transmit PDO is transmitted by the slave device, and the receive PDO is received by the slave device. The CAN ID corresponding to each PDO may contain a related function code according to transmission and reception states. The CAN ID for the PDO having a specific function code may contain an intrinsic CAN ID having the form of combination with the node ID.

FIGS. 5 and 6 show the range of indexes and a sub-index allowable for a PDO transceived over the CANopen network. Each index refers to a service (transmission or reception) of a communication protocol for the service of a PDO. Each sub-index may refer to the value of a COB ID serving as an identifier for a destination node or a destination device, to which a PDO is transmitted, and constituting the PDO. FIG. 7 shows the typically defined standard of COB IDs of transmit and receive PDOs Each of the slave devices 11 and 12 over the CANopen network established according to the COB ID standard receives PDO setting information corresponding to each of the slave devices 11 and 12 before communication is made between the slave devices 11 and 12 and the master device 10. A data frame is transceived between the slave devices 11 and 12, and the master device 10.

However, in the typical CANopen network, each of the slave devices 11 and 12 is set to make communication with only the master device 10. Accordingly, when one slave device 11 must transmit data to another slave device 12, the number of times of frame transmission is significantly required, so that transmission time is significantly spent.

SUMMARY

The disclosure is to provide a method of configurating a CANopen network capable of reducing the number of times of frame transmission by allowing slave devices to transceive PDOs therebetween, a slave device using the same, and a system for controlling a PLC.

The disclosure is to provide a method of configurating a CANopen network capable of allowing a master device to monitor data directly transceived between slave devices, a slave device using the same, and a system for controlling a PLC.

According to the embodiment, there is provided a method of operating a slave device connected to a CANopen network. The method includes creating a process data object for transmission, designating identifier information for the process data object, and transmitting the created process data object to a device corresponding to the designated identifier information. The identifier information includes a communication object identifier allowing another slave device or a master device connected to the CANopen network to receive the process data object.

According to the embodiment, there is provided a method of configurating a CANopen network. The method includes connecting a master device and a plurality of slave devices to the CANopen network, allocating a communication object identifier for the master device such that a process data object is transceived between the master device and the slave devices, and allocating a communication object identifier for each of the slave devices such that the process data object is transceived between the master device and the slave devices.

The master device or the slave devices transceive process data based on the communication object identifier corresponding to the process data object.

According to the embodiment, there is provided a system for controlling a programmable logic controller (PLC) device using a CANopen network. The system includes a first programmable logic controller slave device connected to the CANopen network, and operating by transceiving data from the CANopen network, and a master device connected to the CANopen network to control and manage the first programmable logic controller slave device. The first programmable logic controller slave device creates a process data object for transmission, designates identifier information including a communication object identifier for data reception of a second programmable logic controller slave device or a master device which is connected to the CANopen network to receive the process data object, and transmits the identifier information and the process data object to the CANopen network. The master device or the second programmable logic controller slave device receives the process data object if a communication object identifier for data reception of the second programmable logic controller slave device or the master device matches with the communication object identifier included in the identifier information.

As described above, according to the embodiment, the slave devices constituting the CANopen network can transceive PDOs therebetween.

In particular, the PDO can be directly transceived between the slave devices, so that the number of times of transmission can be reduced, thereby reducing a network load and reducing data transmission time.

Meanwhile, the master device can monitor data transceived between the slave devices, so that the master device connected to the CANopen network can effectively manage the control situation of the PLC system.

BRIEF DESCRIPTION OF THE DRAWINGS

FIGS. 1 to 7 are views to explain the configuration of a CANopen network system according to the related art.

DETAILED DESCRIPTION OF THE EMBODIMENTS

Figure 1:
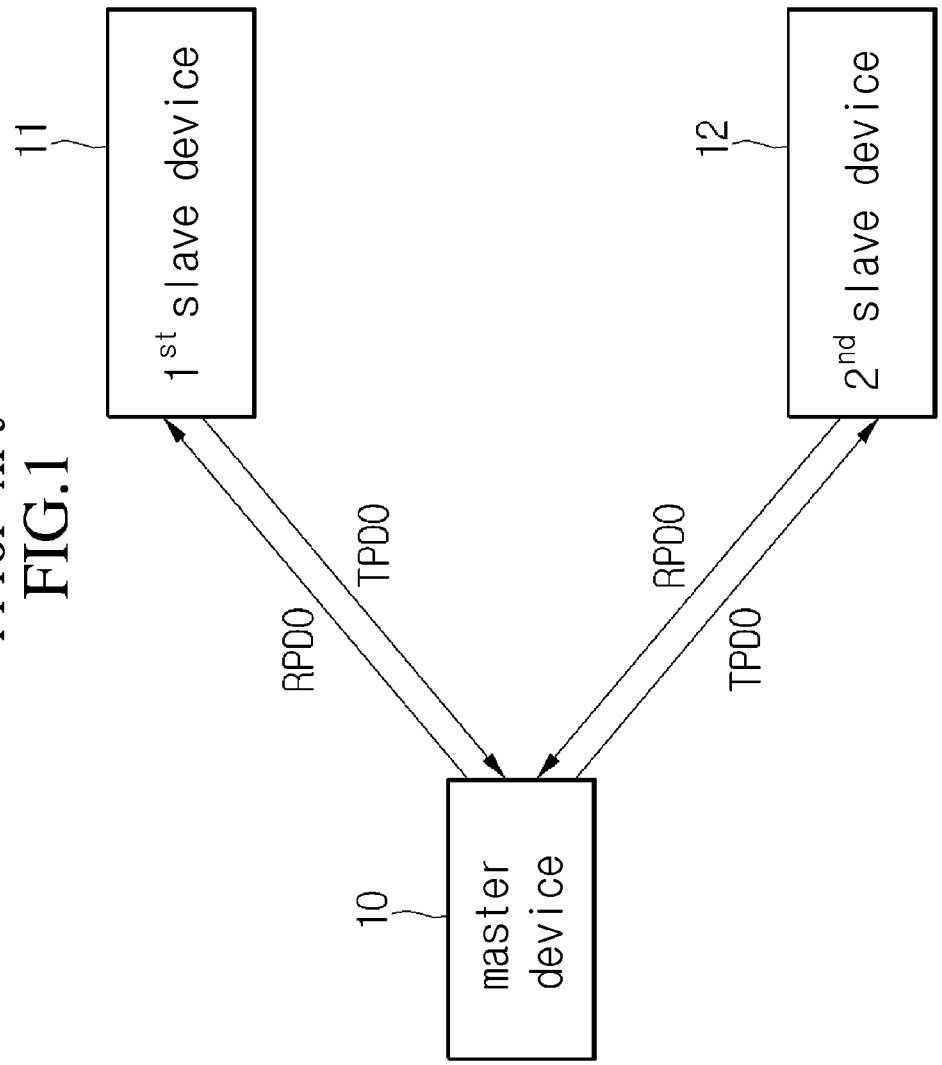
Figure 2:
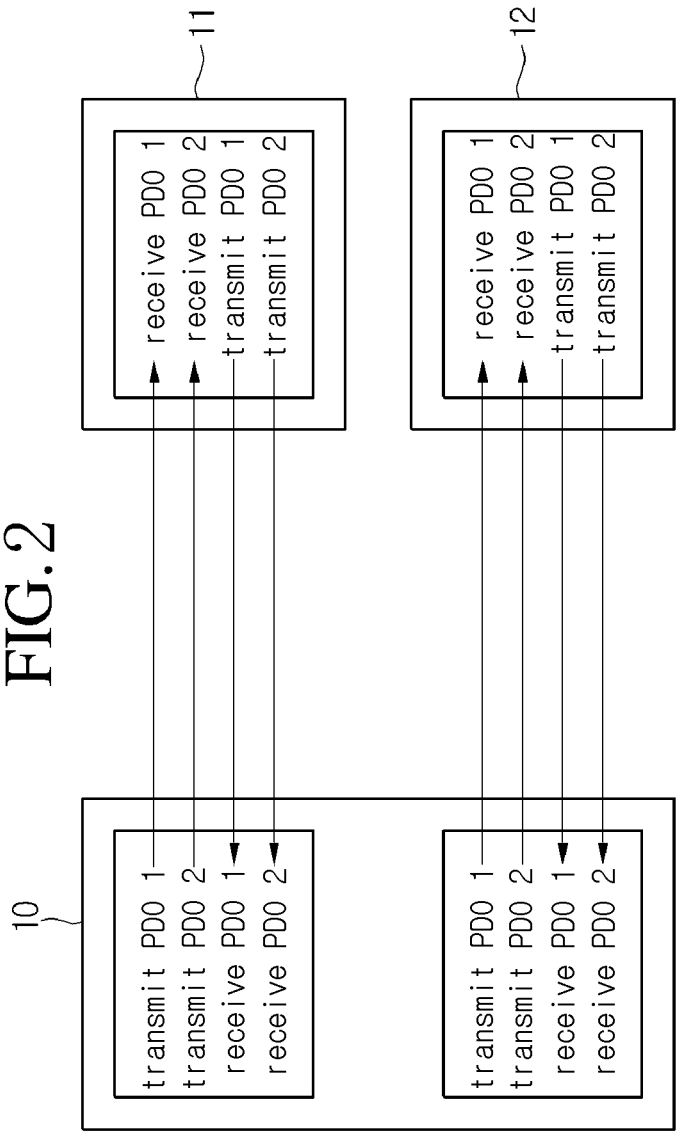

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

Accordingly, for example, it should be understood that a block diagram of the specification illustrates a conceptual point of view of an illustrative circuit that realizes principles of the embodiment. In the same manner, it should be understood that all flowcharts, state transition diagrams, and pseudo codes may be actually represented in a computer readable medium and may represent various processes to be executed by a computer or a processor regardless of whether the computer or the processor is clearly shown.

Functions of various devices shown in drawings including a processor or a function block expressed as a concept similar to the processor may be provided by using hardware capable of executing suitable software as well as dedicated hardware. When the functions are provided by the processor, the functions may be provided by a single dedicated processor, a single shared processor, or a plurality of individual processors and a part of the functions may be shared.

It should be understood that use of a processor, a control or the term presented as a similar concept to the processor and the control shall not be interpreted as exclusively referring to hardware capable of executing software but shall be understood that it implicitly includes a digital signal processor (DSP), ROM, RAM, and non-volatile memory storing hardware and software. Other hardware generally known in the art may be included.

In the accompanying claims, components expressed as a unit to perform a function disclosed in the detailed description are intended to include a combination of circuit devices performing the above function and all methods of performing the above function, such as various types of softwares including a firmware/micro-code. The components are incorporated with suitable for executing the software. Since the disclosure defined by the claims is incorporated with functions of units that are variously provided and the form required by the claims, those skilled in the art should comprehend that any unit to provide the function is equivalent of the disclosure.

The above objects, features, and advantages can be more clearly comprehended through the following description in relation to accompanying drawings. Accordingly, those skilled in the art can easily realize the present inventive concept. In the following description, if detailed description about well-known functions or configurations may make the subject matter of the disclosure unclear, the detailed description will be omitted.

Hereinafter, one exemplary embodiment will be described in detail with reference to accompanying drawings.

Figure 8:
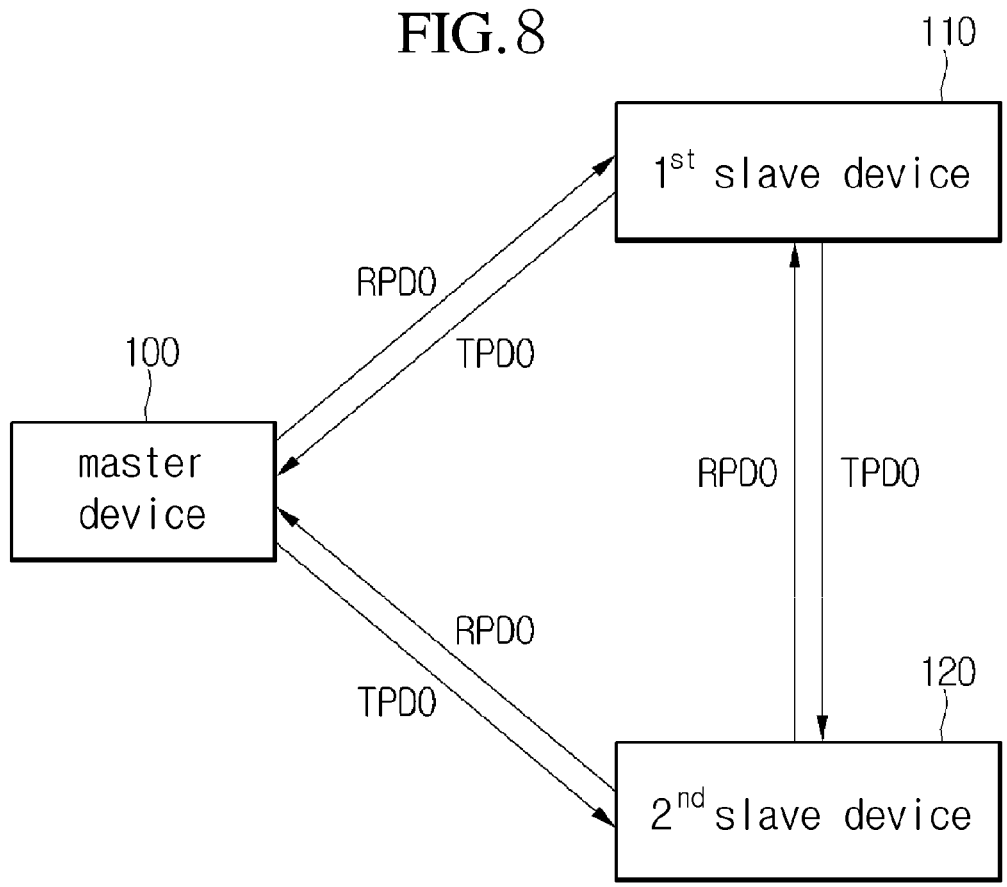
FIG. 8 is a block diagram schematically showing the configuration of a CANopen network system according to one embodiment.

FIG. 8 is a block diagram schematically showing the configuration of a CANopen network system according to one embodiment.

Referring to FIG. 8, the CANopen network system according to one embodiment includes a master device 100, a first slave device 110, and a second slave device 120.

The master device 100 transceives a process data object (PDO) with the first and second slave device 110 and 120.

According to one embodiment, the PDO may be a data object used in a CANopen network. The PDO may contain the information of states of devices having higher priority, and may contain a data object that may be transceived between devices over the CANopen network through a broadcast scheme.

One PDO may contain one CAN protocol frame. Each PDO allows communication based on up to 8-byte application data.

Each PDO may be transceived between devices connected to each other over the CANopen network. To this end, each device may be set with addresses or ports to transmit and receive the PDO.

Meanwhile, the first slave device 110 transceives a PDO with the master device 100 and the second slave device 120.

The first slave device 110 may transceive the PDO with the master device 100 through the same communication scheme as that of a typical CANopen network.

In addition, the first slave device 110 may transceive data with the second slave device 120. In this case, the first slave device 110 may make direct communication with the second slave device 120. Accordingly, different from the related art, since a slave device need not make communication via a master device based on the conventional communication scheme, the number of times of PDO transmission and time for data transmission can be reduced.

Similarly, the second slave device 120 may transceive the PDO with the master device 100 or the first slave device 110. The details of a data transceiving scheme thereof will be described below.

Figure 9:
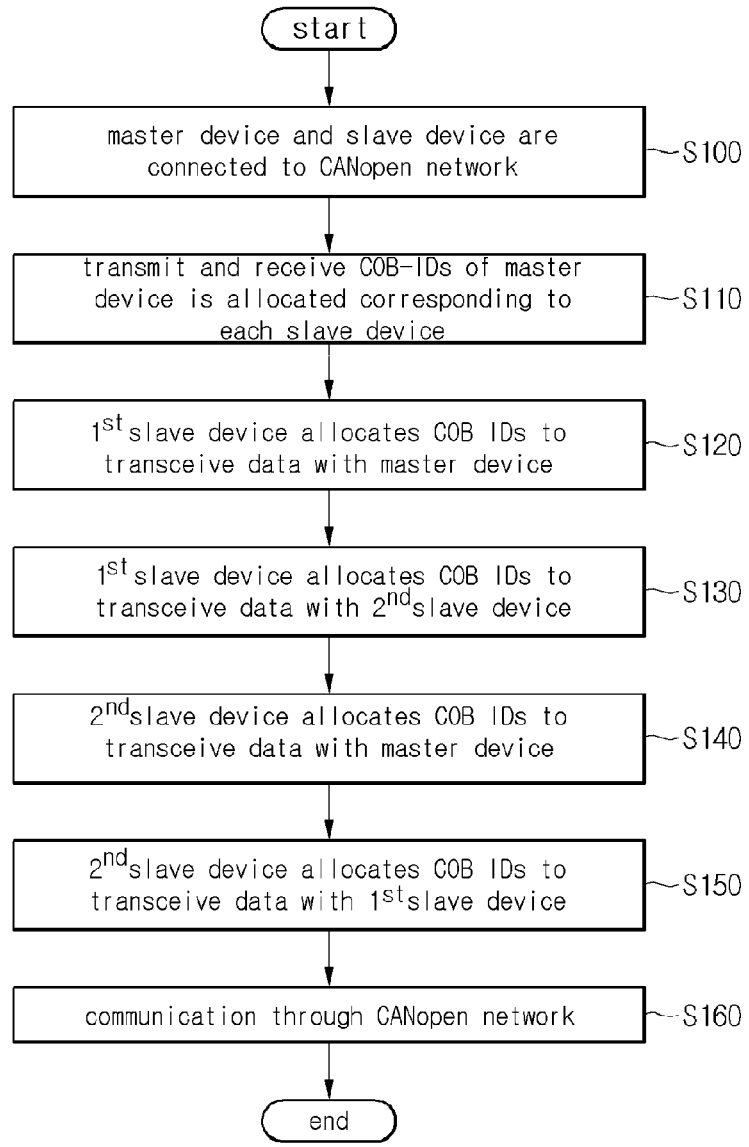
FIG. 9 is a flowchart showing a method of configurating the CANopen network according to one embodiment.

FIG. 9 is a flowchart showing a method of configurating the CANopen network according to one embodiment.

Referring to FIG. 9, first, the master device 100 and the first and second slave devices 110 and 120 are connected to the CANopen network (step S100).

Next, the master device 100 allocates a communication object ID (COB ID), which is used to transceive a PDO with each slave device 110 or 120, corresponding to the related slave device.

The COB ID may be an 11-bit object ID allocated for a CAN frame transceived based on a CANopen protocol. As described above, the COB ID may contain a 4-bit function code and a 7-bit node ID. In addition, the COB ID may contain an address of a port allowing data transmission or data reception or an address ID for data transceive, according to function codes or node IDs.

For example, the master device 100 allocates COB IDs for transmit and receive PDOs corresponding to the first slave device 110, so that the master device 100 can make communication with the first slave device 110. In addition, the master device 100 allocates COB IDs for transmit and receive PDOs corresponding to the second slave device 120. Therefore, each COB ID is used as an address identifier for transmitting or receiving the PDO, so that the master device 100 can transceive the PDO with the second slave device 120.

In this case, in order to generate the COB ID for the transmit PDO and the COB ID for the receive PDO, the master device 100, the first slave device 110, or the second slave device 120 may enter a CANopen setting mode. In the CANopen setting mode, each of the master device 100, the first slave device 110, and the second slave device 120 may allocate the COB IDs according to the setting sequence thereof through a scheme of sequentially allocating addresses. For example, a user may randomly allocate COB IDs within the specific range, for example, the range of 0x681h to 0x6FFh.

In addition, the first slave device 110 allocates COB IDs to transceive data with the master device 100 (step S120). In addition, the first slave device 110 allocates COB IDs to transceive data with the second slave device 120 (step S130).

The first slave device 110 may allocate a COB ID for transmitting or receiving a PDO with the master device 100 through the same scheme as that of the master device 100. Accordingly, the first slave device 110 may use the above CANopen setting mode, and may allocate COB IDs for transmit and receive PDOs corresponding to the master device 100.

In particular, the first slave device 110 may allocate a COB ID to transmit or receive a PDO with the second slave device 120. By using the COB IDs, the first slave device 110 may simultaneously transceive PDOs with the second slave device 120 as well as the master device 100.

In addition, the second slave device 120 allocates COB IDs to transceive data with the master device 100 through the same scheme as those of the first slave device 110 and the master device 100 (step S140), and allocates COB IDs to transceive data with the first slave device 110 (step S150).

The COB IDs allocated by each of the master device 100, the first slave device 110, and the second slave device 120 may be shared with devices connected to the network. Accordingly, the COB ID information between devices connected to the CANopen network may be preset by a user, and the COB ID may be transceived between the devices and previously stored before the communication is made.

Next, if all COB IDs are allocated, the PDOs are transceived among the master device 100, the first slave device 110, and the second slave device 120 by using the COB IDs. As described above, the PDOs may be directly transceived between the first slave device 110 and the second slave device 120, so that the transmission time and the transmission load can be reduced.

Although the description has been made regarding the CANopen network system including the master device 100, the first slave device 110, and the second slave device 120 for the illustrative purpose, a plurality of slave devices or a plurality of master devices may be additionally provided. A plurality of COB IDs may be additionally allocated for the communication between the plural devices. In this case, according to the embodiment, the communication between the slave devices is possible, so that the network load can be reduced, and various communication schemes can be supported without the master device. Accordingly, system compatibility can be enhanced.

Figure 10:
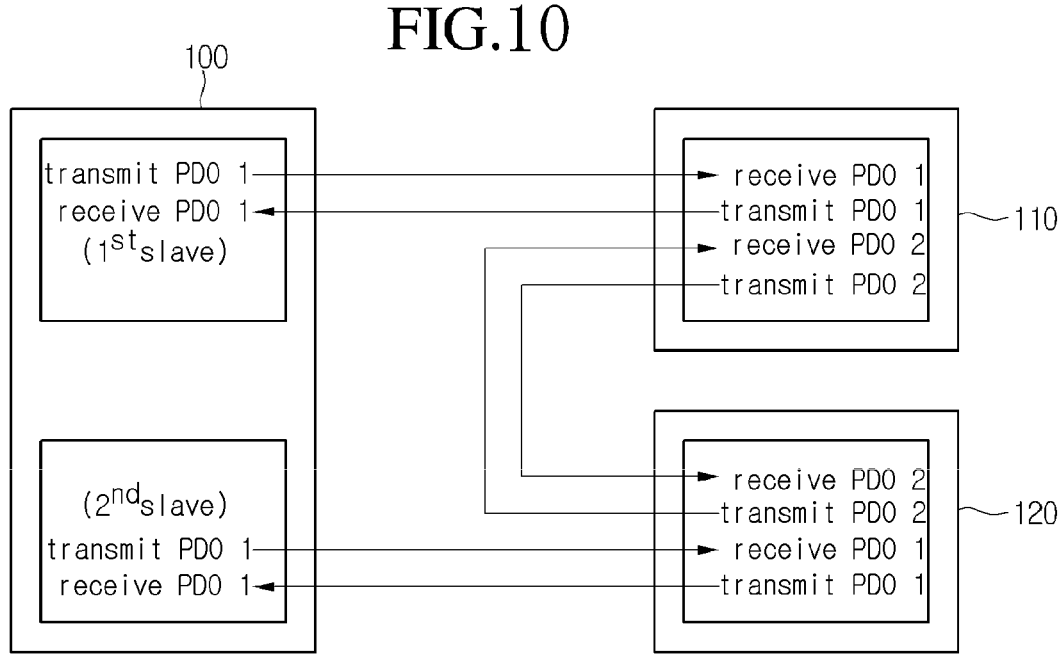
FIG. 10 is a view to explain data transceiving between a master device and a slave device constituting a CANopen network according to one embodiment.

FIG. 10 is a view showing a CANopen network system according to one embodiment.

As shown in FIG. 10, each device may be allocated with a transmit PDO ID and a receive PDO ID by using the COB IDs. Hereinafter, each COB ID will be described together with transmit PDO 1, and the writing of "ID" will be omitted.

A PDO transmitted based on transmit PDO 1 corresponding to a first slave, which is set in the master device 100, may be received by the first slave device 110 through receive PDO 1 of the first slave device 110.

A PDO transmitted through transmit PDO 1 corresponding to a second slave set in the master device 100 may be received by the second slave device 120 through receive PDO 1 of the second slave device 110.

In addition, a PDO transmitted through transmit PDO 1 of the first slave device 110 may be received through receive PDO 1 corresponding to the first slave of the master device 100.

A PDO transmitted through transmit PDO 1 of the second slave device 120 may be received through receive PDO 1 corresponding to the second slave of the master device 100.

Meanwhile, A POD transmitted through transmit PDO 2 of the first slave device 110 may be received through receive PDO 2 of the second slave device 120.

In addition, a PDO transmitted through transmit PDO 2 of the second slave device 120 may be received through receive PDO 2 of the first slave device 110.

Through the CANopen network configured as described above, the PDOs are transceived between the slave devices.

Figure 11:
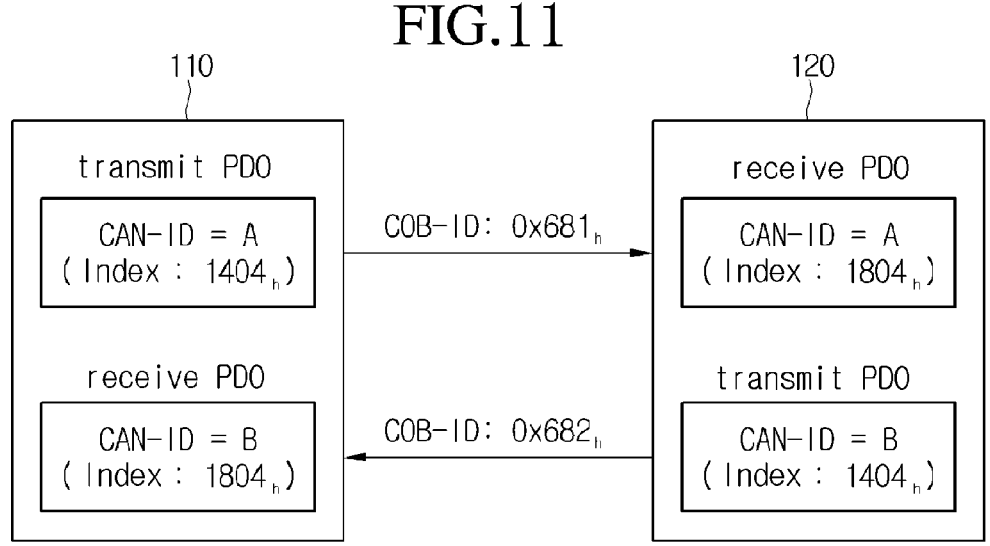
FIG. 11 is a view to explain data transceiving between the slave devices shown in FIG. 10.

FIG. 11 is a view to explain data transceiving between the slave devices shown in FIG. 10 in more detail.

Each of the first slave device 110 and the second slave device 120 may enter the setting mode so that the COB IDs can be allocated therebetween, and the PDOs can be transceived by using the allocated COB IDs.

In the setting mode, a user may designate the value of a COB ID transmitted together with each PDO corresponding to a specific slave device, and may set up in such a manner that each slave device identifies and receives a PDO transmitted together with a specific COB ID.

As shown in FIG. 11, the COB ID corresponding to the transmit PDO of the first slave device 110 and the COB ID corresponding to the receive PDO of the second slave device 120 are set identically to "0x681h", so that the PDO transmitted from the first slave device 110 may be directly received by the second slave device 120.

In addition, the COB ID corresponding to the transmit PDO of the second slave device 120 and the COB ID corresponding to the receive PDO of the first slave device 110 are set identically to "0x682h", so that the PDO transmitted from the second slave device 120 can be directly received by the first slave device 110.

In particular, as described above, the COB IDs are set to the same value between transmit and receive slave devices, so that the transceiving of the PDO is possible between the slave devices without the existing network configuration. Accordingly, installation and configuration cost can be reduced.

Figure 12:
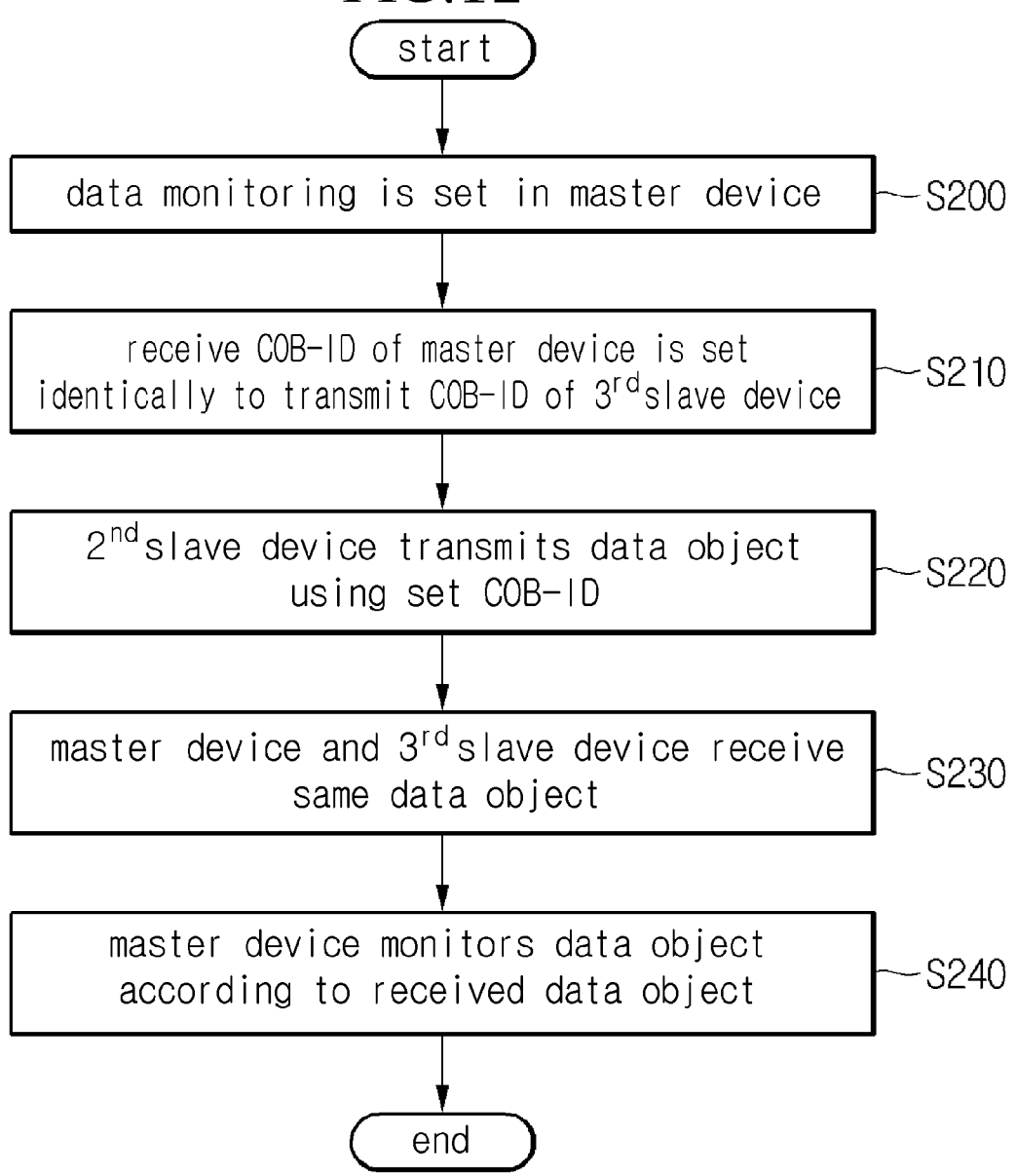
FIG. 12 is a flowchart to explain a method of performing the monitoring of data transceiving between a master device and a slave device connected to the CANopen network according to one embodiment.

FIG. 12 is a flowchart to explain the operation of a PLC control system through the CANopen network according to another embodiment.

According to the embodiment, the master device 100 connected to the above CANopen network can control PLC devices. In particular, the PLC devices may be connected to the slave devices such as the first slave device 110, the second slave device 120, or a third slave device 130, respectively, and controlled by the master device 100. Accordingly, each salve device may be referred to as the first PLC slave device 110, the second PLC slave device 120, or the third PLC slave device 130. Each PLC device may be facilities installed in an industrial field, and the master device 100 may be a control device to manage the PLC device.

Accordingly, even if data are transceived between the slave devices, the master device 100 monitors the transceiving of the data so that the control can be completely achieved.

To this end, the master device 100 sets the on/off of the data monitoring (step S200). In detail, the user may set the on/off of the data monitoring operation through the input into the master device 100. In addition, a facility provider may previously set so that the master device 100 can automatically monitor the data.

Next, if the on/off of the data monitoring is set, the master device 100 allocates a COB ID for the reception of a PDO therein to the same value as that of a COB ID for the reception of a PDO in a target device to be monitored (e.g., the third slave device 130) (step S210).

Thereafter, another slave device (e.g., the second slave device 120) transmits a data object by using the allocated COB ID in order to transmit the PDO to the third slave device 130 (step S220).

Then, the master device 100 and the third slave device 130 receive the same data object, which is transmitted from the second slave device 120, through the CANopen network (step S230).

Thereafter, the master device 100 monitors the PDO received to the third slave device 130 based on the received data object (step S240).

As described above, the master device 100 can simultaneously receive the PDO, which is received in the target slave device from another slave device, together with the target slave device by setting the COB ID thereof identically to the COB ID for the reception of the PDO set in the target slave device. In this case, the master device 100 can perform the data monitoring without the modification of other network components, so that the installation cost can be reduced. Accordingly, the master device 100 can economically and rapidly perform the data monitoring.

Figure 13:
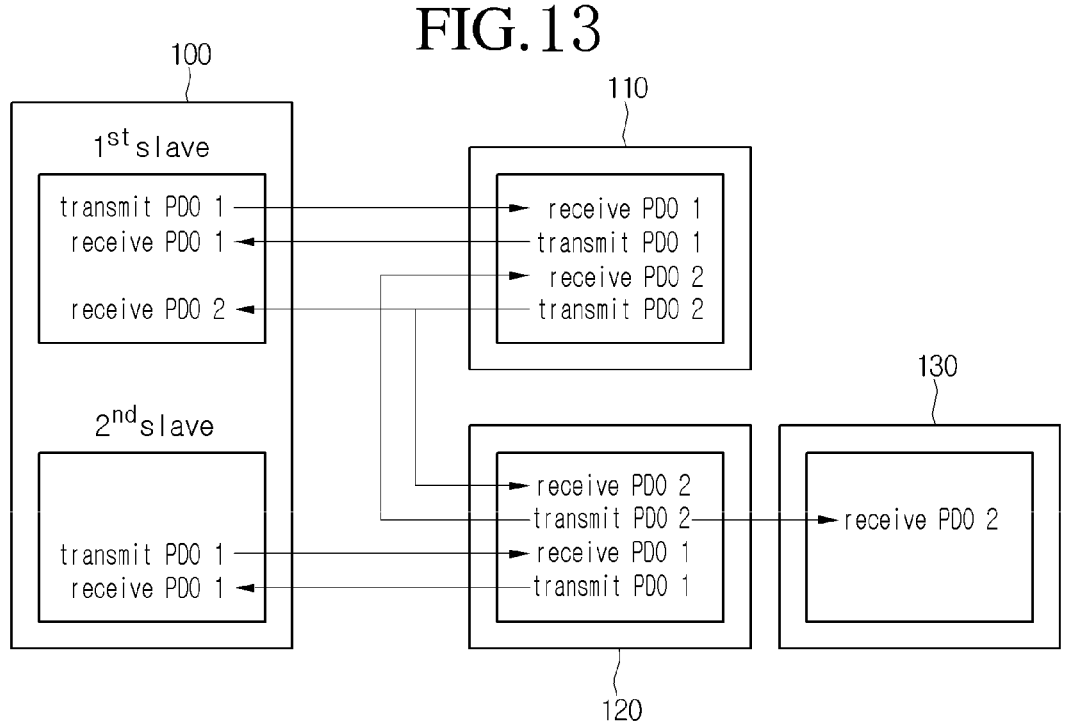
FIG. 13 is a flowchart to explain the operation of a PLC control system through a CANopen network according to still another embodiment.

FIG. 13 is a flowchart to explain the operation of a PLC control system through a CANopen network according to still another embodiment.

In FIG. 13, marked arrows and lines represent that data are transceived by using the same COB ID.

As shown in FIG. 13, devices connected to the CANopen network can simultaneously transceive PODs therebetween by setting specific COB IDs to the same value.

For example, if the first slave device 110 sets a COB ID of transmit PDO 2 thereof, a COB ID of receive PDO 2 corresponding to a first slave of the master device 100, and a COB ID of receive PDO 2 of the second slave device 120 to the same value, PDOs transmitted from the first slave device 110 may be received in both of the master device 100 and the second slave device 120.

In addition, for example, if the second slave device 120 sets a COB ID of transmit PDO 2 thereof, a COB ID of receive PDO 2 of the first slave device 110, and a COB ID of receive PDO 2 of the third slave device 130 to the same value, PDOs transmitted from the second slave device 120 can be received in both of the first slave device 110 and the third slave device 130.

Accordingly, each of the master device 100 and the slave devices 110, 120, and 130 freely allocates the COD ID value to set up the data transceiving operation therebetween, or to release the setting of the data transceiving operation. Therefore, the slave devices can make communication therebetween while the master device 100 can perform the data monitoring. In addition, since the slave devices can make one-to-multiple communication and multiple-to-one communication therebetween, as well as one-to-one communication, advantageous effects can be obtained when expanding and managing the network.

As described above, in the method for configurating the CANopen network, method for operating the slave devices using the method and the system for controlling the PLC device of the embodiment, the communication between the slave devices and freely-setting are possible, so that the network load and the transmission time can be reduced without other additional components, so the network can be easily expanded and managed.

The method of configurating the CANopen network according to the embodiment is realized in the form of a program executed in a computer and stored in a computer-readable medium. The computer-readable recording medium includes a ROM, a RAM, a CD-ROM, a magnetic tape, a floppy disk, and an optical data storage device. Further, the computer-readable recording medium may be implemented in the form of a carrier wave (for example, transmission through Internet).

The computer-readable recording medium may be distributed in computer systems connected with each other through a network and a code which is readable by a computer in a distribution scheme may be stored and executed in the computer-readable recording medium. A functional program, a code and code segments for implementing the method may be easily deduced by programmers skilled in the related art.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a slave device connected to a control area network (CAN) open (CANopen) network to which a first slave device, a second slave device and a master device are connected, the method comprising:
   creating a process data object for transmission;
   designating identifier information for the created process data object; and
   transmitting the created process data object to a device corresponding to the designated identifier information,
   wherein the identifier information includes a communication object identifier allowing the first slave device, the second slave device or the master device to receive the created process data object,
   wherein the communication object identifier for the first slave device, the communication object identifier for the second slave device and the communication object identifier for the master device are matched,
   wherein transmitting the created process data object comprises transmitting the created process data object to the master device and the second slave device at the same time based on the matched communication object identifier.

2. The method of claim 1, further comprising:
   setting a communication object identifier for the second slave device to receive the created process data object; and
   receiving the created process data object from the second slave device by using the set communication object identifier.

3. A method of configuring a control area network (CAN) open (CANopen) network, the method comprising:
   connecting a master device and a plurality of slave devices to the CANopen network; and
   allocating a communication object identifier for the master device and each of the plurality of slave devices such that a process data object is transceived between the master device and the plurality of slave devices
   wherein the communication object identifier for the master device and the communication object identifier for each of the plurality of slave devices are matched, and
   wherein the master device and the plurality of slave devices transceive process data based on the matched communication object identifier corresponding to the process data object.

4. The method of claim 3, further comprising setting a communication object identifier for each of the plurality of slave devices for reception of the process data object from another of the plurality of slave devices.

5. The method of claim 3, further comprising setting a communication object identifier for each of the plurality of slave devices for transmission of the process data object to another of the plurality of slave devices.

6. A system for controlling a programmable logic controller (PLC) device using a control area network (CAN) open (CANopen) network, the system comprising:
   a first PLC slave device connected to the CANopen network, the first PLC slave device operated by transceiving data from the CANopen network; and
   a master device connected to the CANopen network to control and manage the first PLC slave device,
   wherein the first PLC slave device creates a process data object for transmission, designates identifier information including a communication object identifier for data reception of the created process data object by a second PLC slave device or a master device connected to the CANopen network, and transmits the designated identifier information and the created process data object to the CANopen network,
   wherein the master device or the second PLC slave device receives the transmitted process data object if a corresponding communication object identifier for data reception matches the communication object identifier included in the identifier information, and
   wherein the first PLC slave device designates a matching communication object identifier for the second PLC slave device and master device and transmits the created process data object to the second PLC slave device and the master device at the same time based on the matching communication object identifier.

7. The system of claim 6, wherein the master device monitors data transceived between the first PLC slave device and second PLC slave device by using the matching communication object identifier.

8. The system of claim 7, wherein the first PLC slave device sets a communication object identifier for reception of a process data object and receives the process data object transmitted from the second PLC slave device by using the set communication object identifier.

9. The system of claim 8, wherein the first PLC slave device or second PLC slave device enters a setting mode for setting an inter-slave device transceiving operation according to a previously-defined input.

10. The system of claim 9, wherein:
    the communication object identifier for the first PLC slave device and the second PLC slave device are allocated in the setting mode; and
    each communication object identifier is allocated via a sequential allocation scheme or via a random allocation scheme in a specific range by a user.

11. A method for controlling a programmable logic controller (PLC) device using a control area network (CAN) open (CANopen) network, the method comprising:
    connecting a first programmable logic controller (PLC) slave device, a second PLC slave device, and a master device to the CANopen network;
    creating a process data object for transmission by the first PLC slave device;
    designating identifier information including a communication object identifier for data reception of the created process data object by the connected second PLC slave device or master device;

transmitting the designated identifier information and the created process data object to the CANopen network by using the first PLC slave device; and receiving the process data object by using the connected master device or second PLC slave device, wherein receiving the created process data object comprises the master device and second PLC slave device receiving process data at the same time when the communication object identifier of the master device matches the communication object identifier of the second PLC slave device.

12. The method of claim 11, wherein creating the process data object for transmission comprises the first PLC slave device designating identifier information including the communication object identifier of the master device or second PLC slave device.

13. The method of claim 12, further comprising the master device receiving an input related to data monitoring before connecting the first PLC slave device, second PLC slave device and master device to the CANopen network.

14. The method of claim 13, wherein receiving the input related to data monitoring comprises the first PLC slave device or second PLC slave device entering a setting mode for setting an inter-slave device transceiving operation according to a previously-defined input.

15. The method of claim 14, wherein designating the identifier information comprises:

allocating the communication object identifier for each of the first PLC slave device and second PLC slave device in the setting mode; and allocating the communication object identifier via a sequential allocation scheme or via a random allocation scheme in a specific range by a user.

* * * * *